United States Patent [19]

Okada et al.

[11] Patent Number: 5,880,447
[45] Date of Patent: Mar. 9, 1999

[54] DATA OUTPUT CONTROLLER AND DATA OUTPUT SYSTEM USING THIS OUTPUT CONTROLLER

[75] Inventors: Narihiko Okada, Sagamihara; Yoshio Kurishita, Yokohama; Hirobumi Katoh, Chigasaki; Tetsuo Kanno, Fujisawa, all of Japan

[73] Assignees: IBM Japan, Ltd., Tokyo; Advanced Peripherals Technologies, Inc., Kanagawa-Ken, both of Japan

[21] Appl. No.: 804,640

[22] Filed: Feb. 25, 1997

[30] Foreign Application Priority Data

Jul. 2, 1996 [JP] Japan ................................. 8-172247

[51] Int. Cl.$^6$ ........................................ G06K 5/00
[52] U.S. Cl. ........................................ 235/380; 235/382
[58] Field of Search .......................... 235/462, 375, 235/472, 382, 494, 380; 395/600, 800

[56] References Cited

U.S. PATENT DOCUMENTS 4,916,441  4/1990  Gombrich .............................. 235/380
5,490,217  2/1996  Wang et al. ........................... 235/494
5,579,087  11/1996 Salgado ................................. 355/202
5,642,515  6/1997  Jones et al. ........................... 395/727
5,684,956  11/1997 Billings ................................. 395/200

FOREIGN PATENT DOCUMENTS

64238  1/1994  Japan ............................. G06F 3/12

Primary Examiner—Thien Minh Le
Attorney, Agent, or Firm—Volpe and Koenig, P.C.

[57] ABSTRACT

To provide an output data controller which is capable of protecting the secrecy of print data and enhancing operability and where the degree of freedom of system constructability is high. In a file server, ID data is added to the header file of the print data stored in a first queue, and data representative of copy printing is added to the header file stored in a second queue. In security print mode, print data is not output to a printing device, if an ID and a password number collate with each other in a print server. In copy print mode, print data with data representative of copy printing is selected and output to the printing device.

10 Claims, 5 Drawing Sheets

DATA OUTPUT CONTROLLER AND DATA OUTPUT SYSTEM USING THIS OUTPUT CONTROLLER

BACKGROUND OF THE INVENTION

The present invention relates to an output data controller that receives output data generated on archived by a data processor directly or through a line and transmits the received data to an output unit and also relates to a data output system using this data output controller.

For example, the print data, generated or archived by personal computers (PCs) or file servers, is generally printed out by a printing device. In data output systems, which is equipped with a plurality of PCs or a plurality of printing devices, a data output controller called a print server is interposed between a PC or a file server and a printing device.

In the case where a plurality of PCs are present, the PCs are interconnected through a network such as a local area network (LAN), and a file server and a print server are provided on this network. Furthermore, a plurality of kinds of printing devices are connected to this print server.

It is possible in a system such as this to print out desirable print information from any PC to any printing device connected to the print server. In that case the print data is temporarily stored in the file server and then is transmitted from this file server through the print server to a specified printing device, by means of which the data is printed out.

However, if a request to print is performed from a PC, data will be unconditionally printed out from a printing device, as described above, and consequently, when the secrecy of print data is high, there is the problem that others can view the data printed out from the printing device.

Then, there is, for example, a printing device described in Japan Laid-Open Patent Publication No. 4-4238. If the user of a work station selects a password protection mode and outputs print data, command data representative of the password protection mode will then be output from the work station to the printing device. The printing device, if receiving this command data, will inquire of the user about the password number. The user sends the password number to the printing device by using the indication section of the work station, and data is not printed out until this user operates the confirmation section of the printing device (i.e., until passwords match with each other).

However, in the aforementioned Japan Laid-Open Patent Publication No. 4-4238, when a network system is constructed, a printing device with functions meeting various demands cannot be freely selected because the printing device must have a function of confirming whether or not password numbers match with each other, and there is the problem that the degree of freedom of the constructability of the network system is low.

Also, there is the problem that the work stations connected to the network system all have to be equipped with a function of issuing a command representative of a password protection mode.

In addition, in conventional printing systems (including the case where a printing device is connected to a work station without a line), in order to generate a plurality of copies of a print, a plurality of print requests must be output from a work station, or a necessary number of copies of the print generated by a printing device must be made by a copying machine, so there is the problem that the operability is reduced.

BRIEF SUMMARY OF THE INVENTION

Accordingly, it is an objective of the present invention to provide a data output controller which is capable of protecting the secrecy of print data and where the degree of freedom of system constructability is high and to provide a data output system using this data output controller.

Another objective of the present invention is to provide a data output controller which is capable of protecting the secrecy of print data and enhancing operability and where the degree of freedom of system constructability is high and to provide a data output system using this data output controller.

The invention corresponding to claim 1 is provided with: a storage for receiving data output from a data processor connected directly or through a line and storing the received data; an output-requester's data input unit for inputting data of an output requester; a collator for collating whether or not collation data, added to the received data stored in the storage, matches with the data of the output requester input by the output-requester's data input unit; and a data transmitter for transmitting the received data stored in the storage to a data output unit when the matching is collated by the collator.

In accordance with the present invention, as described above, there can be provided a data output controller which is capable of protecting the secrecy of print data and where the degree of freedom of system constructability is high. Also, a data output system using this data output controller can be provided.

In addition, there can be provided a data output controller which is capable of protecting the secrecy of print data and enhancing operability and where the degree of freedom of system constructability is high, and furthermore, a data output system using this data output controller can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will hereinafter be described in reference to the drawings.

Figure 1:
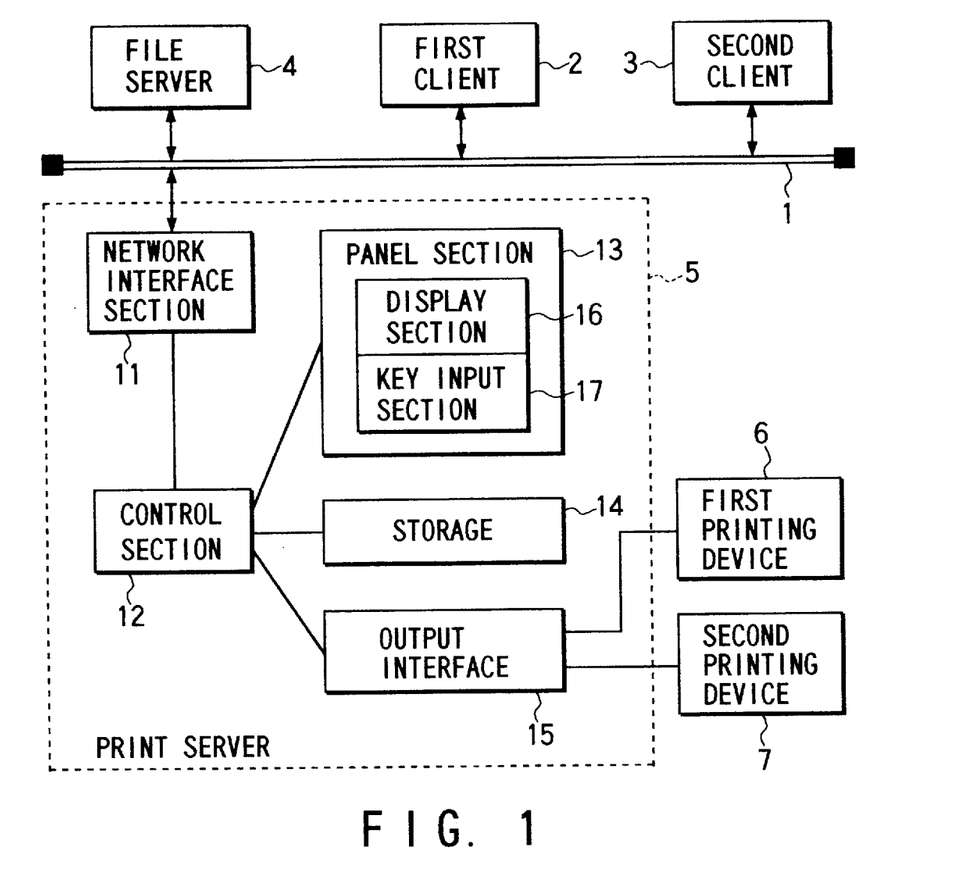
FIG. 1 is a block diagram showing the structure of a network system using a print server of an embodiment of the present invention.

FIG. 1 is a block diagram showing the rough structure of a network system using a print server as a data output controller to which the present invention is applied.

Reference numeral 1 is a local area network (LAN) as a line. A plurality of clients (work stations or personal computers as user terminals), such as first client 2 and second client 3, are connected to this LAN 1.

Also, a file server 4 and a print server 5, which serve as network stations which perform control of the network and management of files and printing, are connected to the aforementioned LAN 1.

A first printing device 6 and a second printing device 7 are connected to this print server 5.

The aforementioned print server 5 is constituted by a network interface 11, a control section 12, a panel section 13, a storage 14 (a nonvolatile memory, such as a hard-disk unit), an output interface 15, and so on.

The aforementioned network interface 11 is connected to the aforementioned LAN 1, communicates with another network terminal through a network (this LAN 1), and has a function of receiving the print data of a request to print and transmitting it to the aforementioned control section 12. In addition, when printing is performed from the LAN 1, at intervals of a single print request task (print data) unit the network interface 11 issues a task start command before transmission of the print data to the aforementioned control section 12 and also issues a task end command after transmission of the print data to the aforementioned control section 12.

The aforementioned control section 12 is constituted by a central processing unit (CPU), a read-only memory (ROM), a random access memory (RAM), etc., although not shown. The control section 12 is connected to the aforementioned network interface 11 and also is connected to the aforementioned panel section 13, the aforementioned storage 14, and the aforementioned output interface 15. This control section 12 receives print data from the aforementioned network interface 11 and stores it in the storage 14 as a single file at intervals of a single print task unit by the task start command and the task end command. From the header file (banner page or separator page) of this print data, the requester of a request to print the data and the file name of the print data are identified. Also, as described later, from the existence of the attached data that has been added to the header file, it is judged whether or not the print data should be stored. When the storage is necessary, the print data is stored in the aforementioned storage 14, and the print data stored in this storage 14 is controlled.

The aforementioned panel section 13 is equipped with a display section 16 consisting of a LCD and a key input section 17 constituted by various kinds of keys. The data and the internal management information, stored in the aforementioned storage 14, are displayed on the aforementioned display section 16, and a key operation which operates equipment is performed in the key input section 17. The aforementioned control section 12 causes the display section 16 of the panel section 13 to display the management operation and management information of the aforementioned storage 14 and also judges the input from the key input section 17 to perform control.

The aforementioned output interface 15 performs data transmission control for outputting the print data, selected from the aforementioned control section 12 and called out from the aforementioned storage 14, to the first printing device 6.

Figure 2:
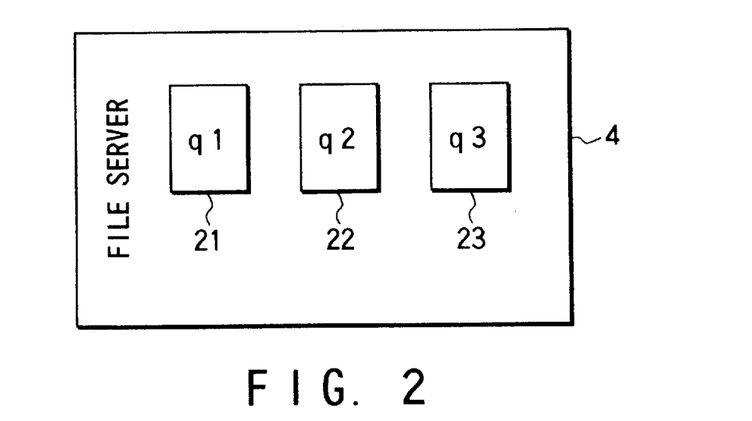
FIG. 2 is a block diagram showing the essential structure of the file server of the network system using the print server of the embodiment.

The aforementioned file server 4, as is shown in FIG. 2, is provided with a first queue (q1) 21 where print data for security is stored, a second queue (q2) 22 where print data for copy is stored, and a third queue (q3) 23 where there is stored print data which is printed out by an ordinary request to print. In the first queue 21 and the second queue 22 there is set a network operating system (NetWare) so that a banner page is previously added. For the third queue 23, it is set, based on other conditions, whether or not a banner page is added.

Figure 3:
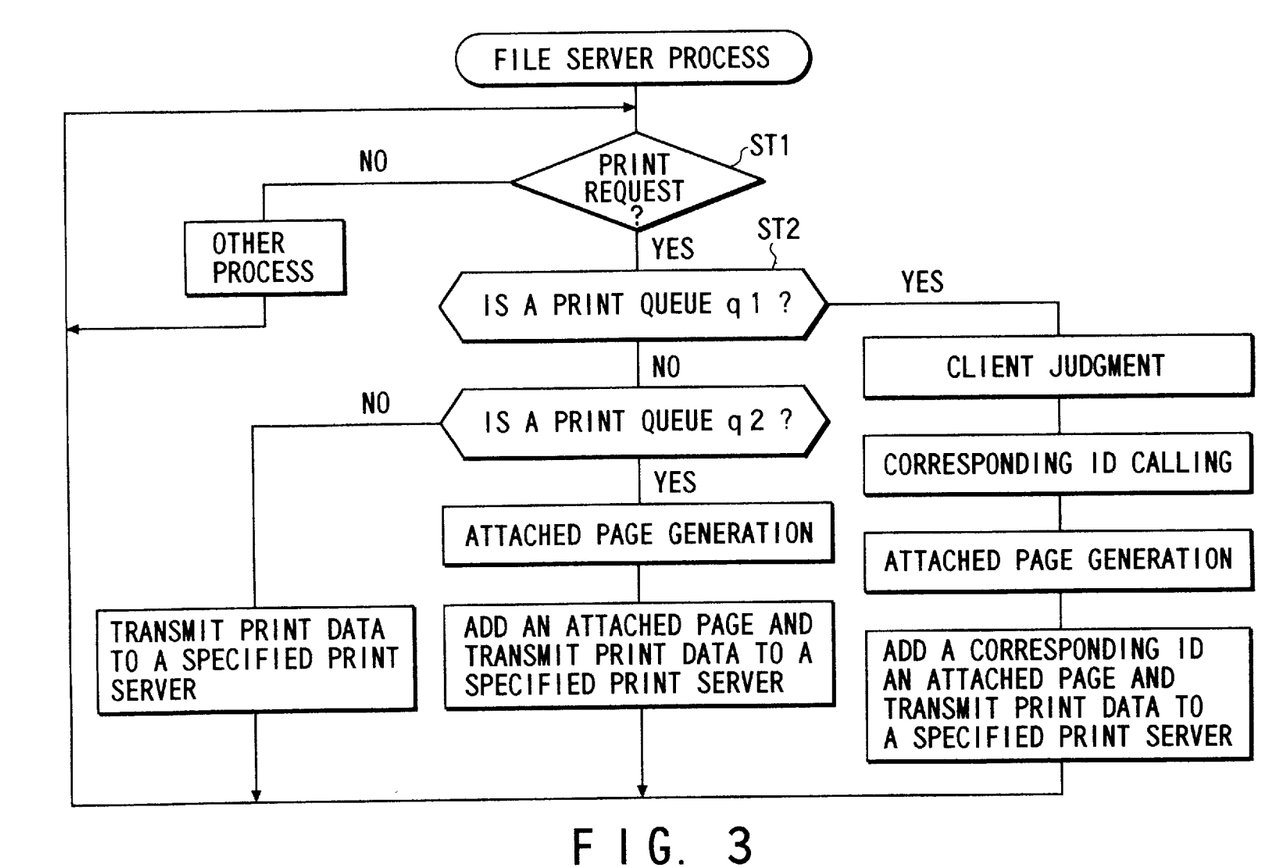
FIG. 3 is a diagram showing the flow of a file server process that is performed by the file server of the network system using the print server of the embodiment.

Note that the set data of a corresponding identification number (ID) of a user has been stored for each client in the aforementioned file server 4 and that the set data of an ID and a corresponding password have been stored for each user in the aforementioned print server 5. FIG. 3 is a diagram showing the flow of a file server process which is performed by the aforementioned file server 4.

First, it is judged in step 1 (ST1) whether or not a request is a print request from a client. If it is judged that the request is not a print request, other processing will then be performed. If this other processing is ended, the processing will then be returned to the aforementioned step 1 again.

Also, if it is judged that the request is a print request, in step 2 (ST2) it will be judged whether or not the request is a print request with respect to the first queue (q1) 21 as a print queue.

Here, if it is judged that the request is a print request with respect to the first queue 21 as a print queue, it will be judged which client transmitted the print request, and the corresponding ID will be called out.

There is generated attached data which includes the called-out ID and which consists of data (queue q1) indicating that data is print data from the first queue 21. This attached data is added to a header file which consists of the user name and file name of the header of print data (in the case of a network operating system, NetWare, a banner page and in the case of Windows NT, a separator page), and this print data is transmitted to the print server 5. If the transmission of the print data to this print server 5 is ended, the processing will then be returned to the aforementioned step 1 again.

Also, if it is judged that the request is not a print request with respect to the first queue 21 as a print queue, it will be judged whether or not the request is a print request with respect to the second queue (q2) 22 as a print queue.

Here, if it is judged that the request is a print request with respect to the second queue 22, there will be generated attached data which includes data indicating that data is print data for copy and which consists of data (queue q2) indicating that data is print data from the second queue 22. This attached data is added to a header file which is added to the header of print data, and this print data is transmitted to the print server 5. If the transmission to this print server 5 is ended, the processing will then be returned to the aforementioned step 1 again.

Also, if it is judged that the request is not a print request with respect to the second queue 22 as a print queue, it will be judged that the request is a print request with respect to the third queue 23, and an ordinary header file will be added (or will not be added) to the header of print data. This print data will be transmitted to the print server 5. If the transmission to this print server 5 is ended, the processing will then be returned to the aforementioned step 1 again.

Figure 4:
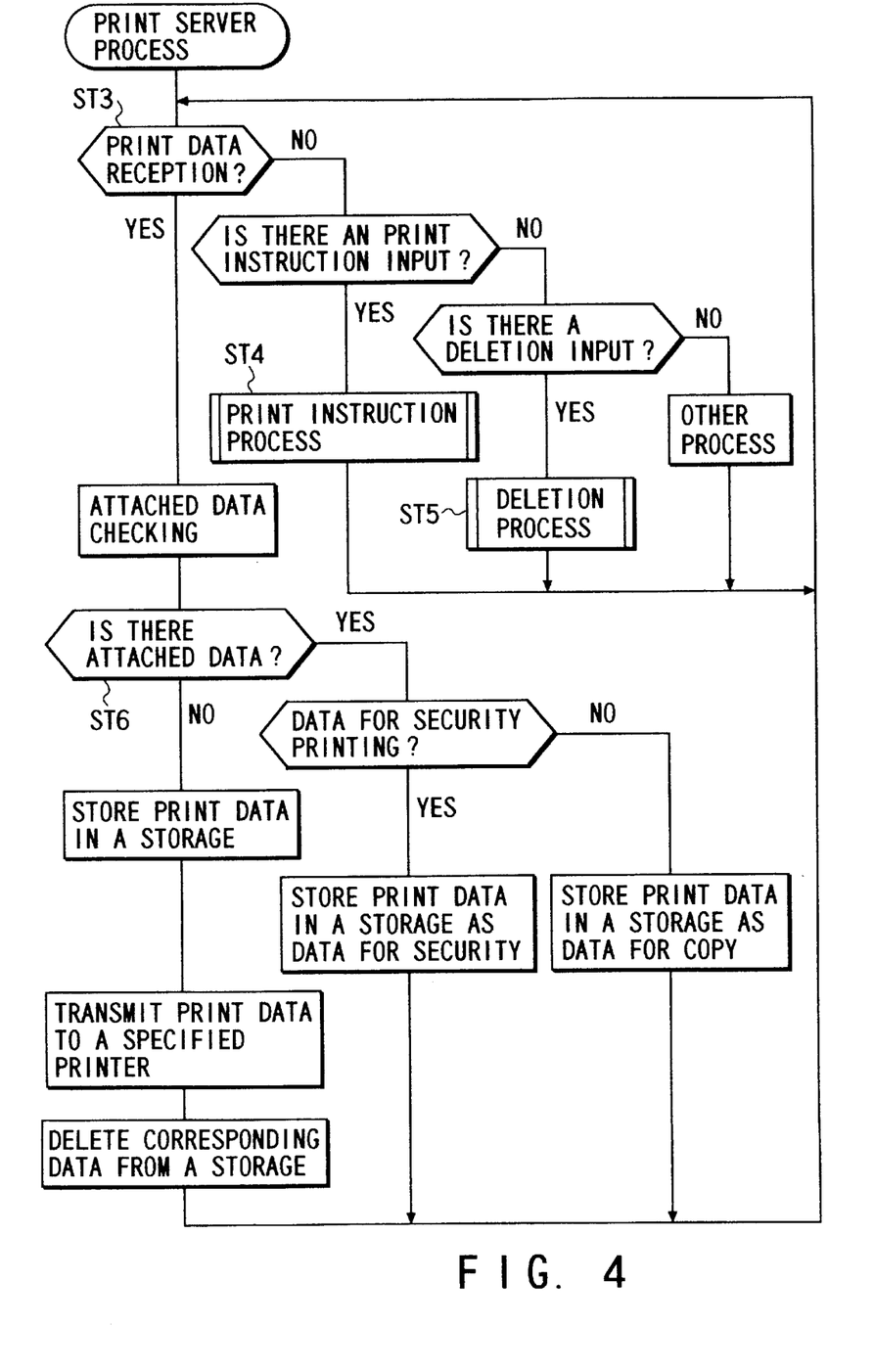
FIG. 4 is a diagram showing the flow of a print server process that is performed by the print server of the embodiment.

FIG. 4 is a diagram showing the flow of a print server process which is performed by the aforementioned file server 5.

Initially, it is judged in step 3 (ST3) whether or not print data was received.

Here, if it is judged that the print data was received, the header file of the print data will be checked and it will be judged in step 4 (ST4) whether data associated to "q1" indicating the first queue 21 or "q2" indicating the second queue is added as the print queue name.

Here, if it is judged that the attached data has not been added, the print data will be stored in the storage 14 because it has been transmitted by the third queue 23, and at the same time, the stored print data will be transmitted to a specific printing device. If the transmission of this print data to the printing device is ended, the print data currently stored in the storage 14 will then be deleted and the processing will be returned to the aforementioned step 3 again.

Also, if it is judged that the attached data of "q1" representative of the first queue 21 or "q2" representative of the second queue 22 has been added as a print queue name, it will be judged whether the received print data is data for security printing, based on whether the print queue name is q1 or q2.

Here, if it is judged that the print data is data for security printing of q1, the print data will be stored in the storage 14 as security printing, and the processing will be returned to the processing of the aforementioned step 3 again.

Also, if it is judged that the print data is data for copy printing of q2, the print data will be stored in the storage 14 as copy printing, and the processing will be returned to the processing of the aforementioned step 3 again.

In addition, if in the process of step 3 it is judged that the print data has not been received, it will be judged whether or not there is a print instruction input from the key input section 17 of the panel section 13.

Here, if it is judged that the print instruction input is present, a print instruction process will be performed in step 4 (ST4), as described later. If this print instruction process is ended, the processing will then be returned to the processing of the aforementioned step 3 again.

If it is judged that the print instruction input is not present, it will then be judged whether or not there is present a deletion instruction input through the key input section 17.

Here, if it is judged that the deletion instruction input is present, a deletion process will be performed in step 5 (ST5), as described later. If this print instruction process is ended, the processing will then be returned to the processing of the aforementioned step 3 again.

In addition, if it is judged that there is no deletion instruction input, other processing will be performed. If this other processing is ended, the processing will then be returned to the processing of the aforementioned step 3 again.

Figure 5:
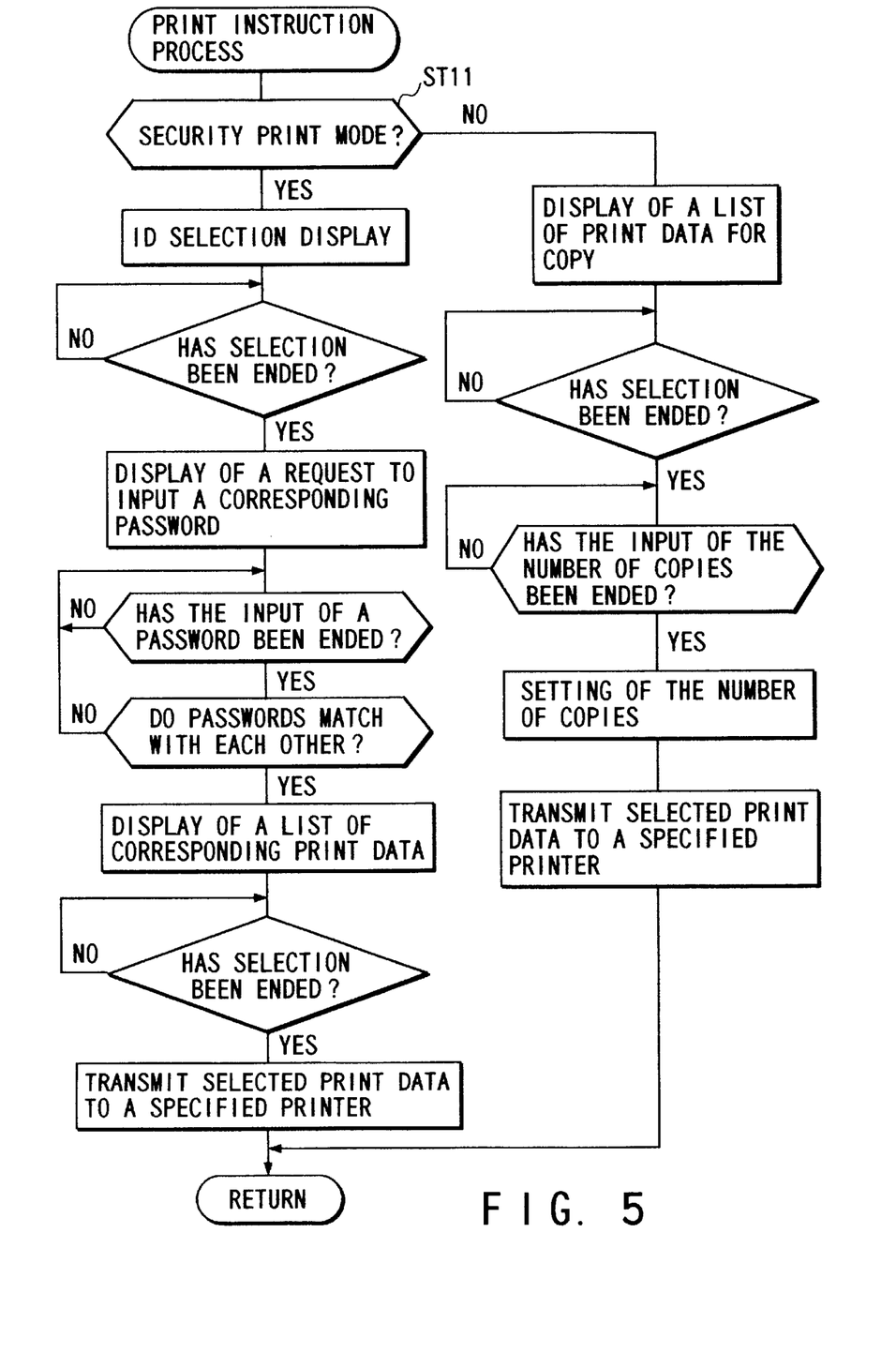
FIG. 5 is a diagram showing the flow of a print instruction process that is performed in the print server process by the print server of the embodiment.

FIG. 5 is a diagram showing the flow of the print instruction process that is performed in the aforementioned step 4 by the printer server 5.

Initially, in step 11 (ST11) it is judged, based on the input from the key input section 17, whether the input is a security print mode or a copy print mode.

Here, if it is judged that the input is a security print mode, a display for selecting user IDs (an ID listing display) will be performed on the display section 16 and the processing will be in a stand-by state until the ID selection by the key input section 17 based on this display is ended.

If the ID selection is ended, a display to request the input of a password corresponding to this display will then be performed on the display section 16 and the processing will be in a stand-by state until the input of the password from the key input section 17 with respect to the display is ended.

If the input of the password is ended, it will then be judged whether or not the input password matches with the password set in the storage 14 in correspondence with the aforementioned selected ID.

Here, if it is judged that the passwords do not match with each other, again the processing will be returned to the aforementioned stand-by state until the input of the password is ended.

Also, if it is judged that the passwords match with each other, a list of the file names of the print data to which the ID data has been added will then be displayed on the display section 16, and the processing will be in a stand-by state until the selection of the password by the key input section 17 is ended.

If the selection of the print data is ended, this selected print data will then be called out from the storage 14 and transmitted to a specified printing device. If this transmission of the print data to the printing device is ended, the corresponding management data of the management table 31 will then be updated and this print instruction processing will be ended.

Also, if in the aforementioned step 11 it is judged, based on the input from the key input section 17, that the input is not a security print mode but a copy print mode, a list of the print data for copy added to the header file among the print data stored in the storage 14 will be displayed on the display section 16, and the processing will be in a stand-by state until the selection of the print data by the key input section 17 is ended.

If the selection of the print data is ended, the processing will then be in a stand-by state until the input of the number of copies by the key input section 17 is ended.

If the input of the number of copies is ended, the number of copies will then be set and the selected print data will be transmitted to a specified printing device. If this transmission of the print data to the printing device is ended, this print instruction process will be ended.

Note that the printing device is constructed so that, in the case where the number of copies has been set, the transmitted print data is printed out by the number of copies.

If this print instruction process is ended, this processing will then be returned to the aforementioned printer server processing again.

Figure 6:
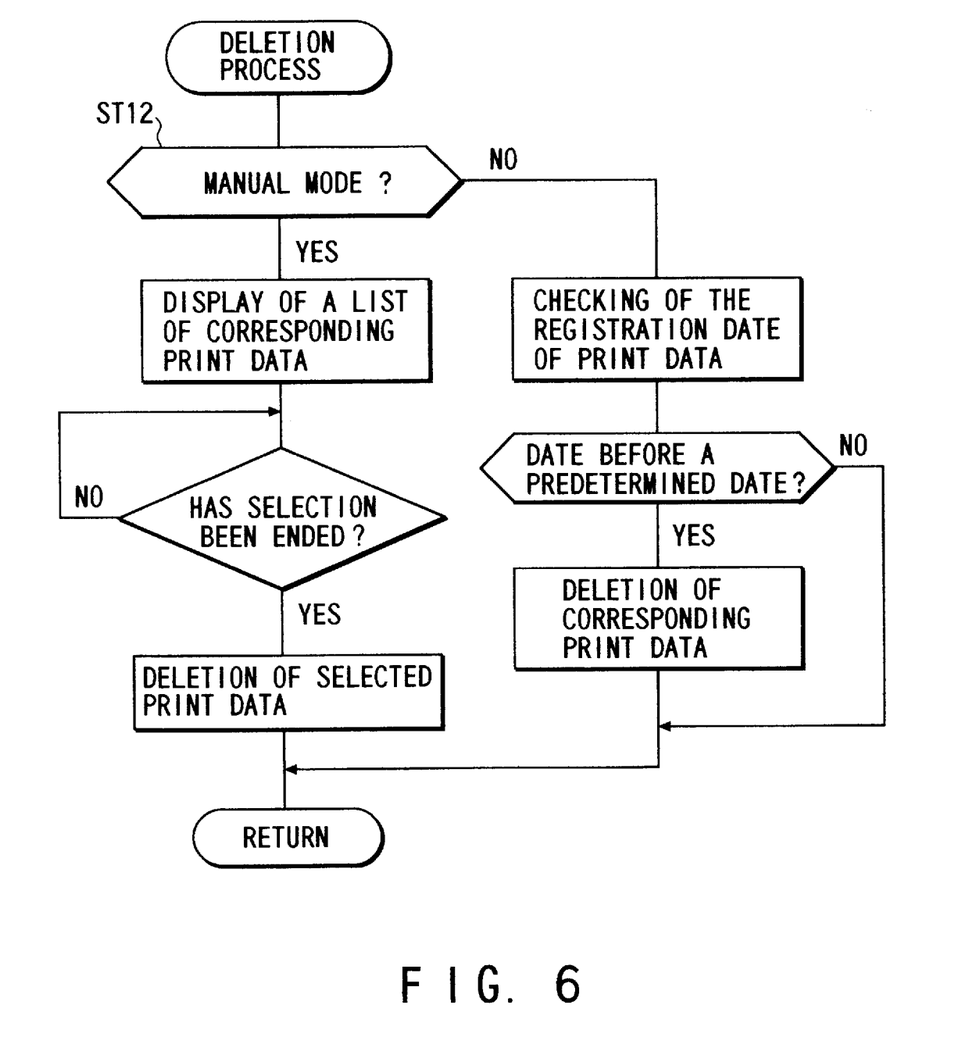
FIG. 6 is a diagram showing the flow of a deletion process that is performed in the print server process by the print server of the embodiment.

FIG. 6 is a diagram showing the flow of a deletion process that is performed in the aforementioned step 5 by the print server 6.

First, in step 12 (ST12) it is judged whether or not the set mode of this print server is a manual mode in which print data can be arbitrarily deleted by an operator.

Here, if it is judged that the set mode is a manual mode, a list of all print data will be displayed by the input of an ID from the key input section 17 on the display section 16, exclusive of the print data for security registered in terms of that ID, or, by the input of an ID from the key input section 17 and the input of the corresponding password, a list of all print data will be displayed on the display section 16, including the print data for security registered in terms of that ID. This processing will be in a standby state until the selection of the print data by the key input section 17 is ended.

If the selection of the print data is ended, confirmation will be again input from the key input section 17 and then the selected print data will be deleted from the storage 14. This deletion processing will be ended. Note that the manual mode has a function which can set specific print data so that it cannot be deleted (or it can be stored eternally).

Also, if in step 12 it is judged that the set 6mode is not a manual mode, the registration date of the print data will be checked and it will be judged whether or not the checked registration dates include the date before a predetermined date from the present date.

Here, if it is judged that all registration dates are not the date before a predetermined date from the present date, this deletion process, as it is, will be ended without deleting the print data.

Also, if it is judged that among registration dates there is the date before a predetermined date from the present date, the print data of the corresponding registration date will be deleted from the storage 14. Then, this deletion process is ended.

If this deletion process is ended, the processing will then be returned to the printer server process again.

In the embodiment constructed as described above, if it is assumed that a manager on the LAN 1 operates the first client 2 as a dedicated device, a password corresponding to an ID will be set for each user to this first client 2, and the set information of the ID and the password set for each user will be transmitted to the print server 5 through the LAN 1.

If the print server 5 receives the set information of the ID and the password for each user, the set information will be stored in the storage 14 and will be used when the control section 12 manages the print data.

A description will be made of the case where the data, generated by any of the clients 2, 3, . . . , is printed.

In the case where an ordinary print mode is selected (i.e., case where the secrecy of generated data is low and there is no obstacle even when others viewed the data), the print requester of the client specifies the third queue (q3) 23 of the file server 4 and transmits a print request from the client, together with data (print data).

The transmitted print data is stored temporarily in the third queue 23 of the file server 4. At this time, the file server 4 can confirm which user (client) issued the request to print, for this print data. An ordinary header file is added to the header of print data (or it is not added). This print data is transmitted from the third queue 23 of this file server 4 to the print server 5.

If the print server 5 receives the print data to which an ordinary header file has been added, it will then be judged whether or not a specific attached page has been added to this print data. For example, it is judged whether or not there has been added data which indicates that data is print data for copy printing or ID data which indicates that data is data for security printing. Here, the print data has been transmitted from the third queue 23, so specific attached data is not added.

Therefore, it is judged that the specific attached data has not been added, the control section 12 of the print server 5 stores the print data in the storage 14 and at the same time transmits the stored print data to a specified printing device. In the specified printing device the print data is printed out on paper.

When a user selects the security print mode, the print requester of a client specifies the first queue 21 (q1) of the file server 4 and transmits the print data from the client, together with the request to print.

The transmitted print data is stored temporarily in the first queue 21 of the file server 4. At this time, the file server 4 adds the banner page, to which the ID data of a user corresponding to a client was added, to the print data and transmits it from the first queue 21 to the print server 5.

If the print server 5 receives the print data to which the banner page with the ID data of a user was added, it will then be judged that the ID data, which indicates that the print data is print data for security, has been added. Therefore, the control section 12 stores the print data in the storage 14 as print data for security. However, in this stage the transmission to the printing device is not performed.

That is, if a print requester (user) indicates and inputs security printing with the key input section 17 of the print server 5, a display for selecting IDs will be performed on the display section 16. If an ID is selected, a display for requesting the input of a password will then be performed on the display section 16. If an input password matches (collates) with the password set in the interior of the print server 5 in correspondence with that ID, the print server 5 will then display, on the display section 16, a list of file names of the print data stored in the storage 14 as print data for security in correspondence with that ID.

If a print requester selects print data, which is printed out, from this list with the key input section 17, the selected print data will then be called out from the storage 14 and transmitted to a specified printing device. The specified printing device will print out the print data on paper.

When a user selects the copy print mode, the print requester of a client specifies the second queue (q2) of the file server 4 and transmits a print request from the client, together with the print data.

The transmitted print data is stored temporarily in the second queue 22 of the file server 4. At this time, the file server 4 adds the header file, where the print data for copy was added to the client, to the print data and transmits it from the second queue 22 to the print server 5.

If the print server 5 receives the print data where the header file with the print data for copy was added, it will then be judged that the print data for copy, which indicates that the print data is print data for copy, has been added. Therefore, the control section 12 stores the print data in the storage 14 as print data for copy. However, in this stage the transmission to the printing device is not performed.

That is, if the print requester indicates and inputs copy printing with the key input section 17 of the print server 5, a list of file names of the print data, stored in the storage 14 as print data for copy printing, will be displayed on the display section 16.

If the print requester selects print data, which is printed out, from this list with the key input section 17 and if the number of copies is set, the selected print data will then be called out from the storage 14 and transmitted to a specified printing device. The specified printing device will print out the print data on the set number of sheets of paper.

Thus, in accordance with this embodiment, the first queue 21 of the file server 4 is specified and print data is transmitted to output a print request. With this, the ID data of a user is added to a header file which is added to the header of the print data. In the printer server 5, if the ID does not match with a password number, the print data with the ID data will not be printed out. Therefore, the secrecy of the print data can be protected.

The aforementioned secrecy protection can be achieved with only the construction of the file server 4 and print server 5. The printing device does not require a special function. Any printing device can be connected to the print server 5 without limiting and selecting the printing device. Therefore, the degree of freedom of the constructability of the system can be enhanced.

Also, the print server 5 is provided with the storage 14 for storing print data. Therefore, even if printing errors occur in the printing device, there is no need to retransmit print data from a client and print data can be output again from the print server 5. Therefore, the operability can be enhanced.

In addition, in accordance with this embodiment, the second queue 22 of the file server 4 is specified and print data is transmitted to output a print request. With this, data representative of copy printing is added to a header file which is added to the header of the print data. In the printer server 5, the print data with data representative of copy printing, stored in the storage 14, can be selected so that copy printing can be performed in the printing device. Therefore, the operability can be enhanced.

While the security print mode and the copy print mode have been completely separated and controlled in this embodiment, the present invention is not be limited to this. The present invention is also applicable to a data output controller with a combined function of the security function and the copy function.

For example, the file server 4 is provided with a fourth queue, and by specifying this fourth queue, data representative of copy printing is included in the header file of print data, together with the ID data of a user. In the print server 5, if an ID and a password number collate with each other, control can be performed so that copy printing is not performed.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

We claim:

1. A data output controller comprising:
   a storage for receiving data output from a data processor connected directly or through a line and storing said received data;
   a copy print data specification unit for specifying data to which data representative of copy printing has been added from among said received data stored in said storage; and
   a data transmitter for transmitting the data specified by said specification unit to a data output unit.

2. A data output controller comprising:
   a storage for receiving data output from a data processor connected directly or through a line and storing said received data;
   an output-requester's data input unit for inputting data of an output requester;
   a collator for collating whether or not collation data, added to said received data stored in said storage, matches with said data of the output requester input by said output-requester's data input unit;
   a copy print data specification unit for specifying data to which data representative of copy printing has been added from among said received data stored in said storage; and
   a data transmitter for transmitting the data specified among said received data stored in said storage by said copy print data specification unit to a data output unit when the matching is collated by said collator.

3. The data output controller as set forth in claim 1, further comprising a deletion unit for deleting said specified data, when there is performed an input which specifies the data stored in said storage and indicates deletion of the data.

4. The data output controller as set forth in claim 2, further comprising a deletion unit for deleting said specified data, when there is performed an input which specifies the data stored in said storage and indicates deletion of the data.

5. A data output system comprising:
   a data processor with a function of transmitting data;
   a data output unit for outputting data; and
   the data output controller as set forth in claim 1 which is connected to said data processor directly or through a line and outputs the data, received from said data processor, to said data output unit; and
   wherein said data processor is provided with a collation data addition unit for adding collation data corresponding to an output requester to data which is output and a data transmitter for outputting the data, to which said collation data has been added, to said data output controller and wherein said data output unit outputs the data transmitted from said data output controller.

6. A data output system comprising:
   a data processor with a function of transmitting data;
   a data output unit for outputting data; and
   the data output controller as set forth in claim 2 which is connected to said data processor directly or through a line and outputs the data, received from said data processor, to said data output unit; and
   wherein said data processor is provided with a collation data addition unit for adding collation data corresponding to an output requester to data which is output and a data transmitter for outputting the data, to which said collation data has been added, to said data output controller and wherein said data output unit outputs the data transmitted from said data output controller.

7. A data output system comprising:
   a data processor with a function of transmitting data;
   a data output unit for outputting data; and a data output controller comprising:
      a storage for receiving data output from a data processor connected directly or through a line and storing said received data;
      an output-requester's data input unit for inputting data of an output requester;
      a collator for collating whether or not collation data, added to said received data stored in said storage, matches with said data of the output requester input by said output-requester's data input unit;
      a data transmitter for transmitting the received data stored in said storage to a data output unit when the matching is collated by the collator; and
      a deletion unit for deleting specified data, responsive to an input which specifies the data stored in said storage and indicates deletion of the data; said data output controller being connected to said data processor directly or through a line and outputs the data, received from said data processor, to said data output unit; and wherein said data processor is provided with a collation data addition unit for adding collation data corresponding to an output requester to data which is output and a data transmitter for outputting the data, to which said collation data has been added, to said data output controller and wherein said data output unit outputs the data transmitted from said data output controller.

8. A data output system comprising:

a data processor with a function of transmitting data;

a data output unit for outputting data; and the data output controller as set forth in claim 1 which is connected to said data processor directly or through a line and outputs the data, received from said data processor, to said data output unit; and wherein said data processor is provided with a copy print data addition unit for adding data representative of copy printing to data which is output and a data transmitter for outputting the data, to which the data representative of copy printing has been added, to said data output controller and wherein said data output unit outputs the data transmitted from said data output controller.

9. A data output system comprising:

a data processor with a function of transmitting data;

a data output unit for outputting data; and the data output controller as set forth in claim 2 which is connected to said data processor directly or through a line and outputs the data, received from said data processor, to said data output unit; and wherein said data processor is provided with a copy print data addition unit for adding data representative of copy printing to data which is output and a data transmitter for outputting the data, to which the data representative of copy printing has been added, to said data output controller and wherein said data output unit outputs the data transmitted from said data output controller.

10. A data output system comprising:

a data processor with a function of transmitting data;

a data output unit for outputting data; and a data output controller comprising:

a storage for receiving data output from a data processor connected directly or through a line and storing said received data;

an output-requester's data input unit for inputting data of an output requester;

a collator for collating whether or not collation data, added to said received data stored in said storage, matches with said data of the output requester input by said output-requester's data input unit;

a data transmitter for transmitting the received data stored in said storage to a data output unit when the matching is collated by the collator; and a deletion unit for deleting specified data, responsive to an input which specifies the data stored in said storage and indicates deletion of the data; said data output controller being connected to said data processor directly or through a line and outputs the data, received from said data processor, to said data output unit; and wherein said data processor is provided with a copy print data addition unit for adding data representative of copy printing to data which is output and a data transmitter for outputting the data, to which the data representative of copy printing has been added, to said data output controller and wherein said data output unit outputs the data transmitted from said data output controller.

* * * * *

UNITED STATES PATENT AND TRADEMARK OFFICE
CERTIFICATE OF CORRECTION

PATENT NO : 5,880,447
DATED : March 9, 1999
INVENTOR(S) : Okada et al.

It is certified that error appears in the above-identified patent and that said Letters Patent is hereby corrected as shown below:

In column 1, at line 8, delete "on" and insert therefor --or--.
In column 1, at line 37, delete "4-4238" and insert therefor --6-4238--.
In column 1, at line 49, delete "4-4238" and insert therefor --6-4238--.

Signed and Sealed this

Thirty-first Day of August, 1999

Attest:

Q. TODD DICKINSON

*Attesting Officer*   *Acting Commissioner of Patents and Trademarks*